United States Patent
Zeng

(10) Patent No.: US 10,178,295 B2
(45) Date of Patent: Jan. 8, 2019

(54) WIRELESS CAMERA LENS CONTROL SYSTEM WITH HIGH PRECISION MOTOR DRIVERS AND WIRELESS CONTROL

(71) Applicant: TILTA INC., Burbank, CA (US)

(72) Inventor: Wenping Zeng, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 15/640,136

(22) Filed: Jun. 30, 2017

(65) Prior Publication Data

US 2018/0343377 A1    Nov. 29, 2018

Related U.S. Application Data

(60) Provisional application No. 62/510,735, filed on May 24, 2017.

(51) Int. Cl.
| | |
|---|---|
| *H04N 5/232* | (2006.01) |
| *F16M 13/04* | (2006.01) |
| *G03B 17/56* | (2006.01) |
| *G03B 13/34* | (2006.01) |
| *G03B 5/00* | (2006.01) |

(52) U.S. Cl.
CPC ........ *H04N 5/23203* (2013.01); *F16M 13/04* (2013.01); *G03B 5/00* (2013.01); *G03B 13/34* (2013.01); *G03B 17/563* (2013.01); *G03B 2205/0046* (2013.01); *G03B 2205/0092* (2013.01)

(58) Field of Classification Search
CPC ........... H04N 5/23203; H04N 5/23216; G03B 17/563
See application file for complete search history.

(56) References Cited

U.S. PATENT DOCUMENTS

| | | | | |
|---|---|---|---|---|
| 5,389,997 A | * | 2/1995 | Ohishi | G02B 27/646 |
| | | | | 348/E5.046 |
| 5,638,267 A | * | 6/1997 | Singhose | G05B 5/01 |
| | | | | 700/28 |
| 9,167,145 B2 | | 10/2015 | Idemura et al. | |
| 9,420,188 B2 | | 8/2016 | Ito et al. | |
| 2003/0025802 A1 | * | 2/2003 | Mayer, Jr. | G03B 7/12 |
| | | | | 348/211.99 |

(Continued)

FOREIGN PATENT DOCUMENTS

| | | |
|---|---|---|
| CN | 204272270 | 4/2015 |
| EP | 0574105 A1 | 12/1993 |

(Continued)

OTHER PUBLICATIONS

European Search Report & Written Opinion 17185709.7 dated Mar. 2, 2018; 6 pages.

*Primary Examiner* — Ahmed A Berhan
(74) *Attorney, Agent, or Firm* — Loza & Loza, LLP; Derek Yeung

(57) ABSTRACT

A camera lens control system that has improved flexibility and lens control precision in various configurations. The camera lens control system has a handle that is wirelessly connected to a control motor for controlling focus, zoom, or aperture of a lens. In addition, the handle is used to maneuver the camera during shooting. The camera lens control system includes one or more control motors that can be connected in series to share power and control signals.

13 Claims, 7 Drawing Sheets

(56) References Cited

U.S. PATENT DOCUMENTS

| | | | |
|---|---|---|---|
| 2013/0128110 A1* | 5/2013 | Jannard | H04N 5/2252 |
| | | | 348/375 |
| 2014/0146193 A1* | 5/2014 | Yang | H04N 5/23203 |
| | | | 348/211.4 |
| 2015/0189151 A1 | 7/2015 | Ito et al. | |
| 2015/0288858 A1 | 10/2015 | Fee | |
| 2016/0131983 A1 | 5/2016 | Holovinger et al. | |

FOREIGN PATENT DOCUMENTS

| | | |
|---|---|---|
| FR | 2768286 A1 | 3/1999 |
| WO | 2015101822 A1 | 7/2015 |

* cited by examiner

WIRELESS CAMERA LENS CONTROL SYSTEM WITH HIGH PRECISION MOTOR DRIVERS AND WIRELESS CONTROL

CROSS-REFERENCE TO RELATED APPLICATION(S)

This application claims the benefit of U.S. Provisional Application Ser. No. 62/510,735, entitled "CAMERA LENS CONTROL SYSTEM" and filed on 24 May 2017, which is expressly incorporated by reference herein in its entirety.

TECHNICAL FIELD

The technology discussed below relates generally to camera lens control, and more particularly, to a wireless camera lens control system.

INTRODUCTION

In motion picture or video production, a camera may be controlled using a lens control system. The lens control system can include control motors for controlling an array of lens and camera functions, for example, focus, iris, and zoom operations. In some examples, the lens control system may be referred to as a three-axis lens control system. A three-axis lens control system generally includes a motor driver (also known as the "hub") and one or more control motors for controlling focus, iris, zoom, and/or other camera functions. The motor driver (hub) provides various control functions of the control motors such as torque, speed, lens calibration profiles, etc. Some motor driver may be operated from a remote controller. A typical motor driver controls the lens control motors via wired connections. Such implementation is clumsy and limits the flexibility of the system. Moreover, typical lens control motors have limited level of precision or resolution in motor rotation and position control.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
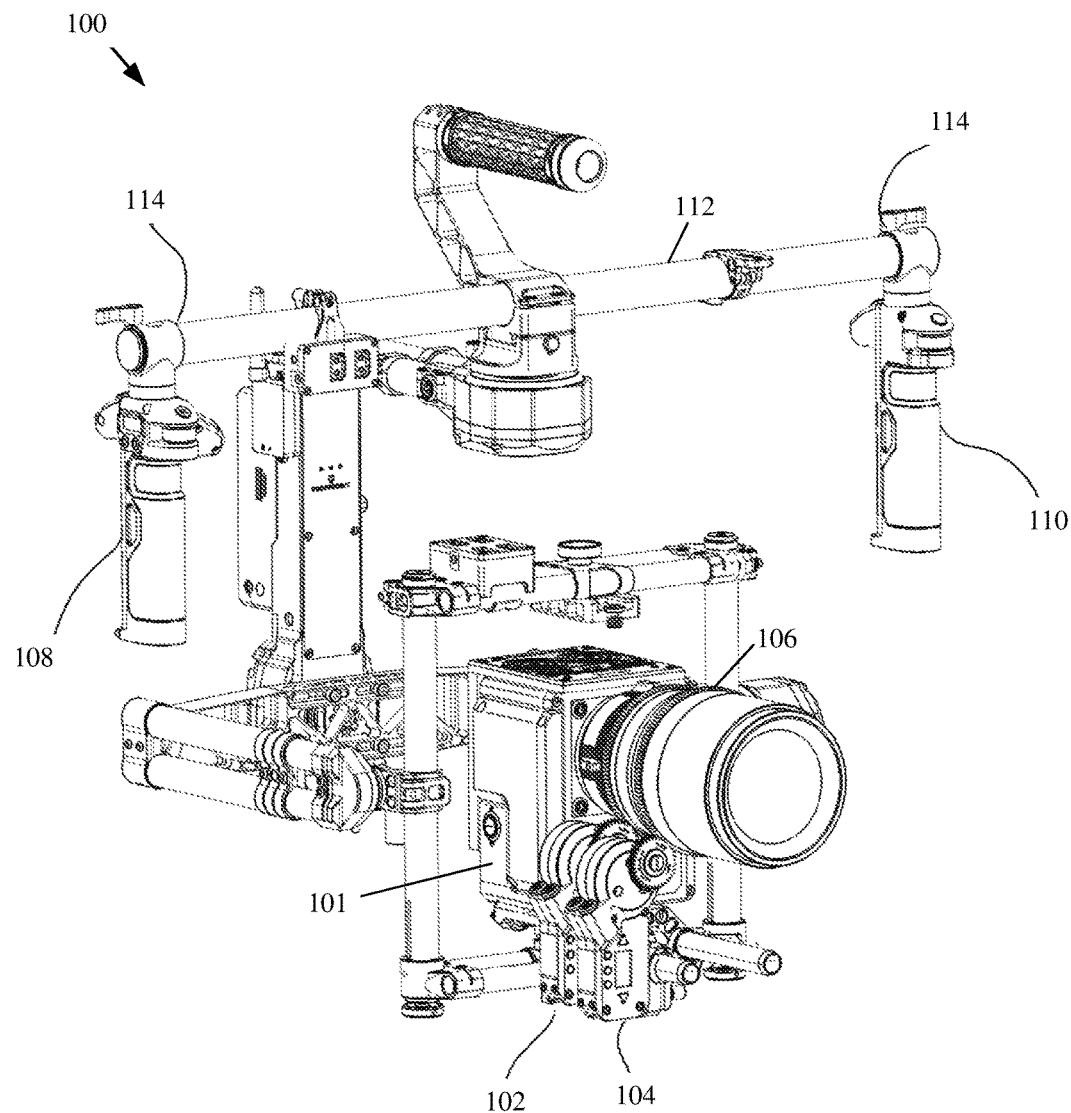
FIG. 1 is a diagram illustrating an exemplary camera rig according to an embodiment.

Embodiments of the present disclosure provide a camera lens control system with improved connection flexibility and lens control precision in various configurations. FIG. 1 is a diagram illustrating an exemplary camera rig 100 according to an embodiment. The camera rig 100 includes a camera 101 and a camera lens control system. The camera lens control system may include one or more control motors for controlling focus, zoom, and aperture (iris) of the camera. Two exemplary control motors 102 and 104 are illustrated in FIG. 1. In some examples, the camera lens control system may include three control motors for controlling focus, zoom, and aperture via respective gear rings 106 on the lens. In some embodiments, the control motors may be DC brushless motors, stepper motors, or the like. Each control motor can engage or turn a gear ring 106 on the lens to adjust focus, zoom, or aperture of the lens.

Figure 2:
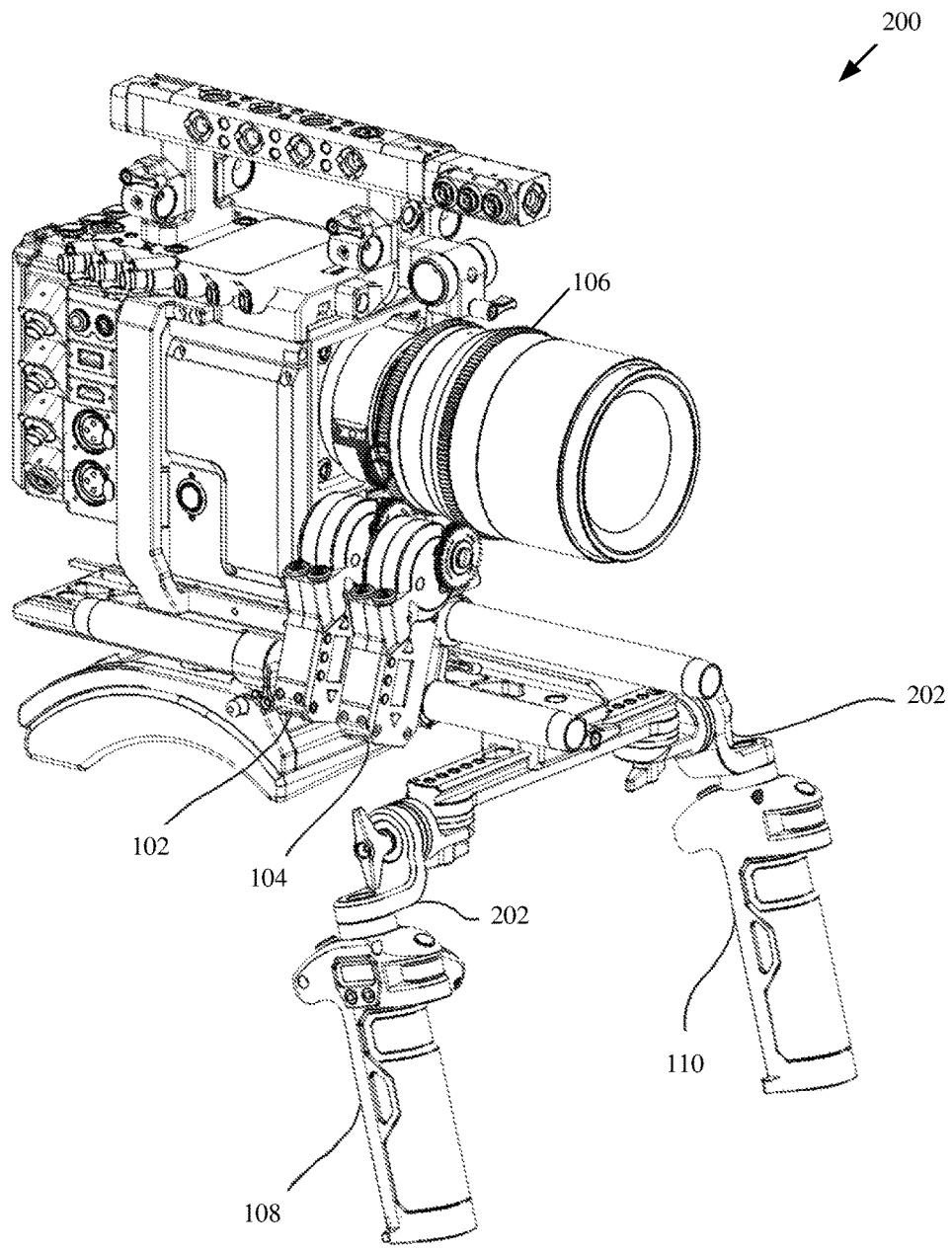
FIG. 2 is a diagram illustrating another exemplary camera rig according to another embodiment.

The camera lens control system may include one or more handles (may also be called as handgrips or other similar names) for maneuvering and pointing the camera rig during shooting. In this embodiment, two handles 108 and 110 are mounted on or attached to a triaxial stabilizer 112 bar using suitable adapters 114 or couplers. In addition to providing physical control of the camera rig, the handles are equipped to wirelessly control the control motors. 102 and 104. FIG. 2 is a diagram illustrating another exemplary camera rig 200 according to another embodiment. In this embodiment, the handles 108 and 110 may be firmly attached to a shoulder frame using suitable adapters 202.

Figure 3:
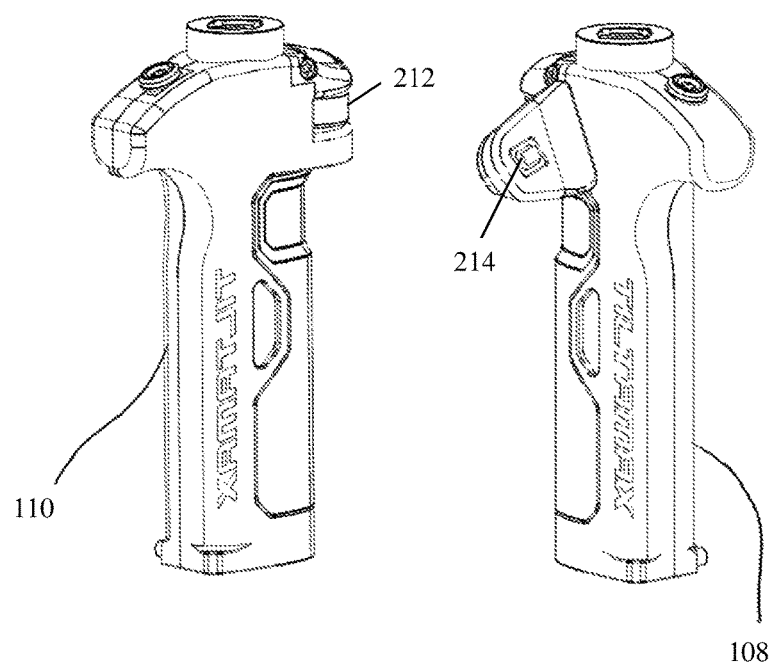
FIG. 3 is a diagram illustrating the handles shown in FIGS. 1 and 2 in more details.

FIG. 3 is a diagram illustrating the handles 108 and 110 in more details. The handle 108 may be a right handle or handgrip, and the handle 110 may be a left handle or handgrip. The handles allow the operator to physically maneuver, control, position, point, and/or direct the camera rig in various operations during or between shootings. In some embodiments, each handle (e.g., handles 108 and 110) is equipped with various circuitry that can control one or more associated control motors using a wireless connection or communication interface. The handle may have one or more input devices (e.g., knob, dial, scroll wheel, joystick, button, switch, touchpad, pressure sensor, touch sensor) configured to receive user input corresponding to a desired lens control operation. The input devices may be located at positions that can be easily reached by the user's fingers without releasing the handle. Therefore, a user (e.g., camera operator) can use the input device of the handle to wirelessly control a corresponding control motor (e.g., control motors 102, 104), for example, rotation and/or angular position of the control motor. Such handle is advantageous because the user can use the handle to maneuver the camera rig while controlling the control motor(s) using the input devices that are easily accessible by the user's thumbs or fingers.

In one embodiment, a handle includes circuitry that can control two control motors using, for example, a scroll wheel and a joystick, respectively. In another embodiment, a handle includes circuitry that can control one control motor using, for example, a scroll wheel or the like. An exemplary scroll wheel 212 and an exemplary joystick 214 are shown FIG. 3. The handle 108 may be a right handle, and the handle 110 may be a left handle. In some embodiments, the left and right handles may control different control motors (e.g., one control motor for the left handle and two control motors for the right handle). In some embodiments, the left and right handles may control the same number of control motors or different numbers of control motors. In still some embodiments, the left and right handle may have other configurations for controlling the desired number of control motors. In some embodiments, a camera rig may have only one handle (e.g., handle 110 or 108). In other embodiments, the handle may have other shapes and sizes different from the handles shown in FIGS. 1-3.

Figure 4:
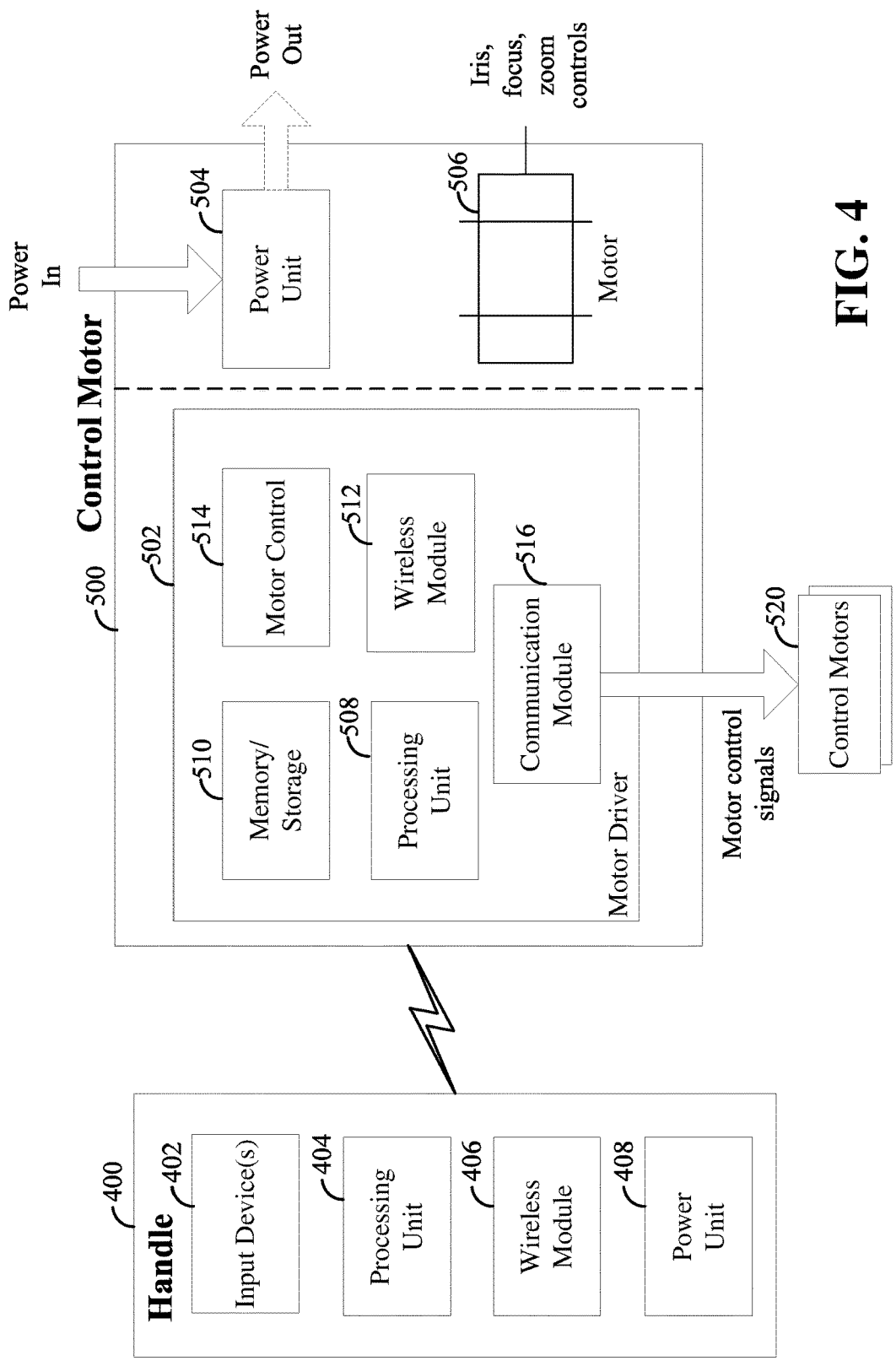
FIG. 4 is a block diagram illustrating some components of an exemplary handle and an exemplary control motor according to an embodiment.

FIG. 4 is a block diagram illustrating some components of an exemplary handle 400 and an exemplary control motor 500 according to an embodiment. The handle 400 may be any of the handles shown in FIG. 1-3. The control motor 500 may be any of the control motors shown in FIGS. 1, 2, 5, and 6. Some components not necessary for understanding the present invention may be omitted in FIG. 4 for brevity.

The handle 400 may include one or more input devices 402, a processing unit 404, a wireless module 406, and a power unit 408. These components are operatively coupled together. The input devices 402 receive inputs or commands from a user for wirelessly controlling the control motor 500. Non-limiting examples of the input devices 402 are knobs, dials, scroll wheels, joysticks, buttons, switches, touchpads, pressure sensors, touch sensors, and more. The input device may convert the user's input into a signal (e.g., an electrical signal) that is provided to the processing unit 404 for processing.

The processing unit 404 may be configured to perform various functions including camera lens control functions (e.g., iris, zoom, and focus) via the control motor 500. The processor 404 is operatively coupled to the input devices 402 and wireless module 406 via for example a data bus or any suitable communication network. The processing unit 404 receives an input signal from the input device 402 and converts the input signal into the corresponding motor control signal that is wirelessly transmitted to the control motor 500 via the wireless module 406. Examples of processing unit 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In some examples, the control signal may be coded to rotate the control motor and/or set the control motor at a certain angular position.

The wireless module 406 may be configured to wirelessly transmit the control signal to the control motor 500. The wireless module 406 may be implemented to support any desired or wireless communication protocols and standards (e.g., Bluetooth, Wi-Fi, Wireless USB, WiGig, etc.) known in the art or custom protocols. In some embodiments, the wireless module 406 may include one or more wireless transmitters and receivers for transmitting and receiving wireless signals.

The power unit 408 may include a battery and other circuitry that can supply and regular power to other components of the handle, for example, the input devices 402, processing unit 404, and wireless module 406. The power unit 408 may include charging circuitry for charging the battery. The charging circuitry may receive external power for charging the battery. In some embodiments, the power unit 408 (e.g., battery) may be removable from the handle 400.

The control motor 500 includes a motor driver 502, a power unit 504, and a motor 506 that are operatively coupled to each other. The power unit 504 receives power from an external source (e.g., battery, power supply, etc.) and provides power to the motor driver 502 and motor 506. The power unit 504 may include circuitry that conditions and/or converts the input power to suitable voltage and/or current levels for powering the motor driver 502 and motor 506.

The motor driver 502 includes circuitry for receiving wireless commands from the handle 400 and controlling the motor 506 based on the received commands. The motor driver 502 may include a processing unit 508, a memory/storage 510, a wireless module 512, a motor control circuit 514, and a communication module 516.

The processing unit 508 may be configured by executing code stored in the memory/storage 510 to perform various functions including motor control functions and communication functions. For example, processing unit 508 may utilize the motor control circuit 514 to provide suitable pulses of current/voltage to the motor 506 for controlling the speed, torque, and angular position of the motor 506. The motor control circuit 514 can also read or detect the motor's phase and/or position using suitable magnetic or photo sensors. The processing unit 508 may utilize the wireless module 512 to wirelessly communicate with the handle 400 to receive one or more commands or signals such that a user of the handle may control the motor 506 remotely or wirelessly. The wireless module 512 may be implemented to support any desired wireless communication protocols and standards (e.g., Bluetooth, Wi-Fi, Wireless USB, WiGig, etc.) that may be known in the art. In some embodiments, the wireless module 512 may include one or more wireless transmitters and receivers for transmitting and receiving wireless signals.

In some embodiments, the power unit 504 may provide power (shown as Power Out in FIG. 4) to other devices. For example, the power unit 504 may have an input power connector for receiving power from a power source and an output power connector for outputting power to another control motor. Therefore, power can be transferred from one control motor to another control motor via the connectors connected in a daisy chain fashion. For example, the output power connector of a first control motor can be connected to the input power connector of a second control motor, such that there is no need to wire each control motor to a power source separately. This configuration can help reducing the wirings of a camera lens control system using the control motor 500.

In some embodiments, the communication module 516 may forward motor control signals to other control motors that may not be able to communicate with the handle 400 wirelessly or directly. The communication module 516 may use the same power out connector described above to route a data connection to another control motor (e.g., a slave motor). Therefore, a single wired connection between two control motors may include power and control signals. In some embodiments, the control motor in wireless communication with the handle 400 may be called the master control motor. The master control motor can accept wireless commands from one or more handles, and forward the commands to the corresponding slave control motors that are connected to the master control motor via the communication module using a wired connection. When there are two or more slave control motors, they can be connected to the master control motor in a daisy chain fashion, for example, using the input power and output power connectors. In response to a control command from the handle 400, the motor control circuit 514 outputs a suitable motor control signal to control the corresponding motor 506 or a slave control motor that may be configured to control iris, focus, or zoom of a camera lens. The motor 506 may be a DC brushless motor or a stepping motor, and the motor control circuit 514 provides pulses of voltage/current to the motor windings that control the speed, torque, and angular position of the motor 506 according to the commands received from the handle 400.

In some embodiments, the motor driver 502 may be implemented as an independent unit or entity physically separated from the motor 506. In that case, the motor driver 502 as a separate unit may be connected to one or more control motors 520 via the communication module 516 or other suitable wired or wireless connections. In some embodiments, the control motor 500 may not include a motor driver.

Figure 5:
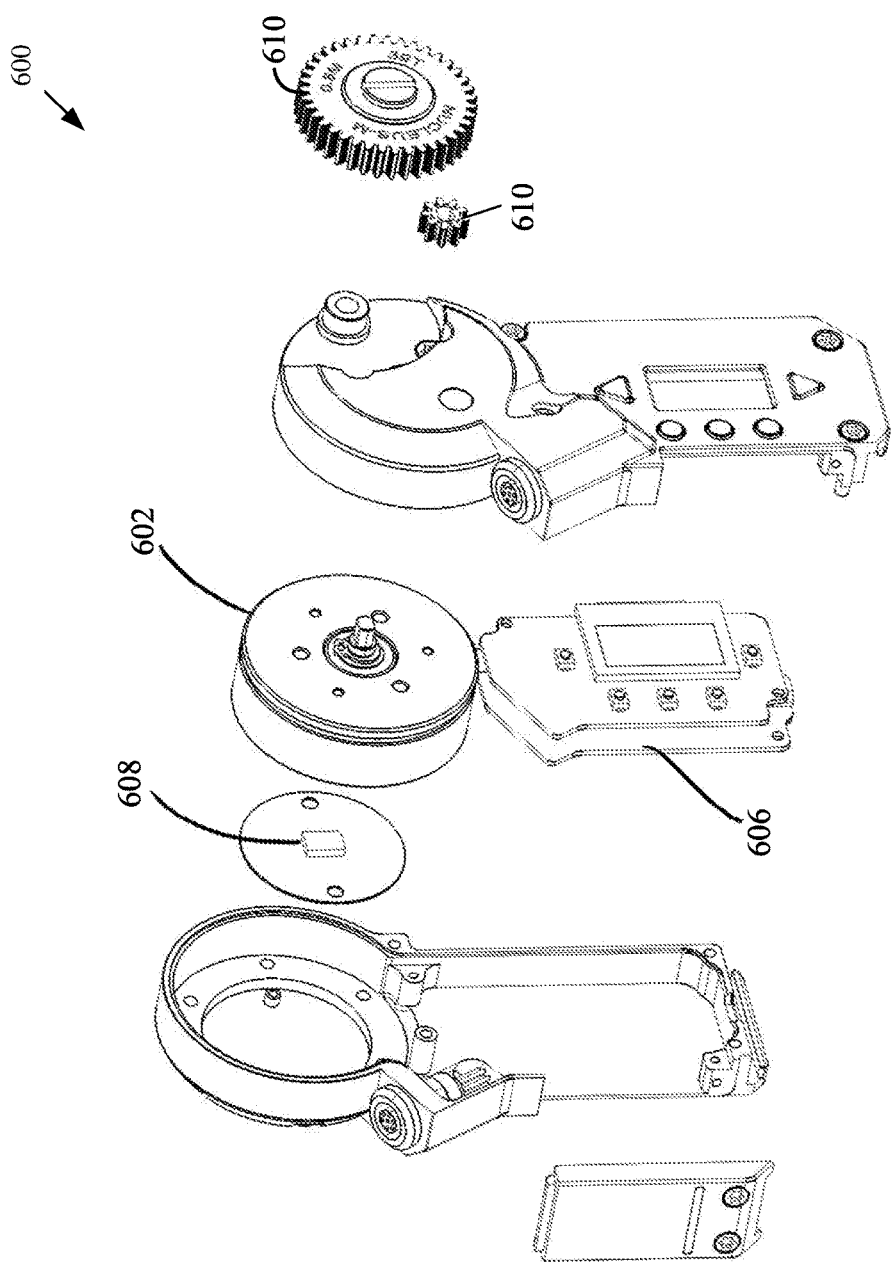
FIGS. 5 and 6 are drawings illustrating exploded views of an exemplary control motor according to an embodiment.
Figure 6:
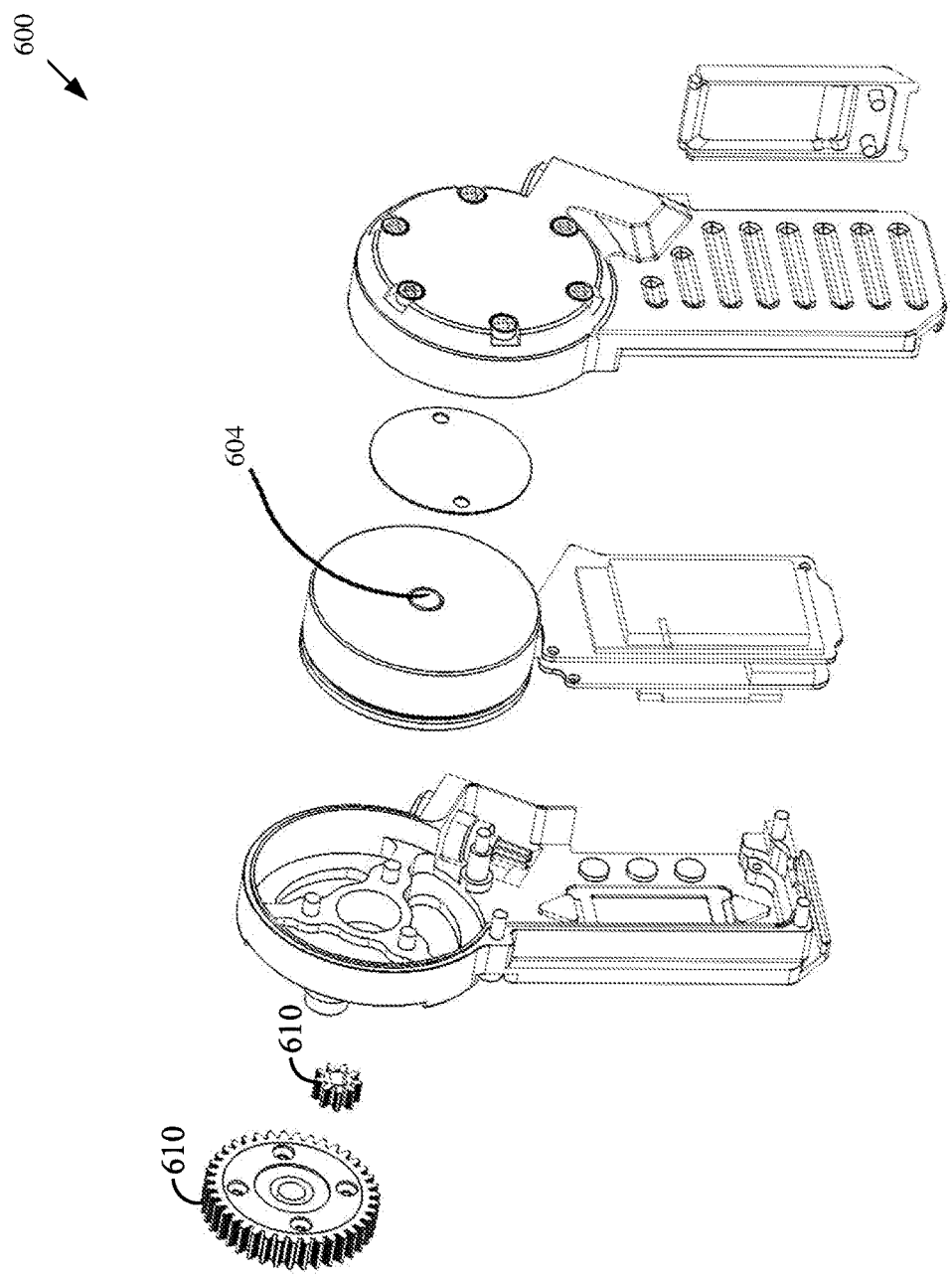

FIGS. 5 and 6 are drawings illustrating exploded views of an exemplary control motor 600 according to an embodiment. The control motor 600 may be any of the control motors shown in FIGS. 1, 2 and 4. The control motor 600 includes a brushless motor 602, a magnet or grating 604 on the back of the brushless motor 602, a motor driver 606, and a magnetic or photoelectric encoder 608. The motor driver 606 may be similar to the motor driver 502 of FIG. 4. The motor driver 606 can read the motor's phase and/or angular position using the magnetic or photoelectric encoder 608, so as to drive or control the motor's angular position or steps according to commands received directly from the handle 400 or indirectly via another control motor.

In some embodiments, the magnetic or photoelectric encoder has very high precision (e.g., 4000 counts per revolution or higher) so that the angular position of the motor can be determined and controlled with a high degree of accuracy. For example, the encoder 608 may detect thousands of different angular positions of the motor 602. Based on the commands received from the handle 400, the motor driver 606 can turn or rotate the motor to the desired angular position that may be accurately detected by the encoder. The motor 602, as it turns, may engage a gear ring (e.g., gear ring 106) via one or more gears 610.

Figure 7:
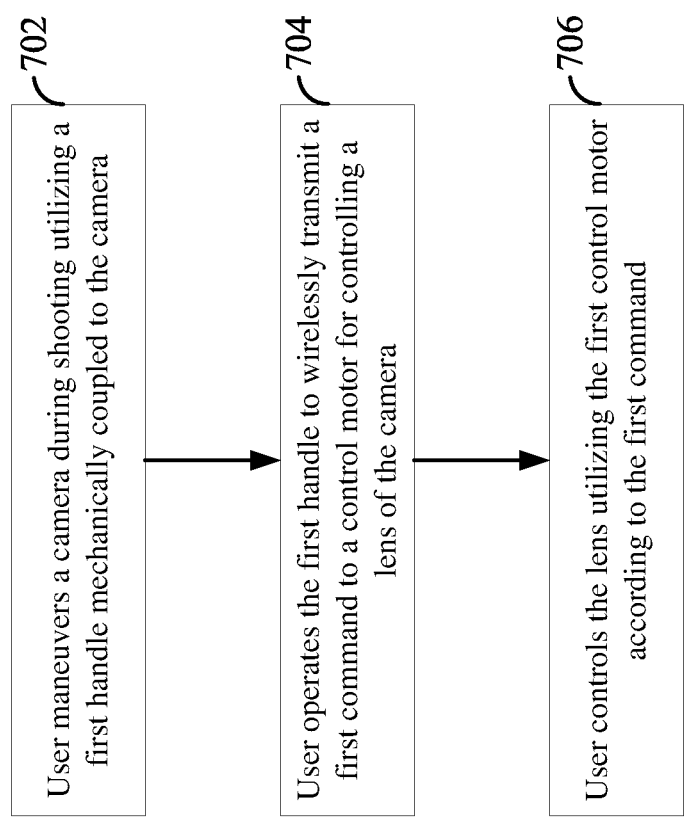
FIG. 7 is a flow chart illustrating a method of controlling a camera according to an embodiment.

FIG. 7 is a flow chart illustrating a method 700 of controller a camera. At block 702, a user may maneuver the camera during shooting utilizing a first handle mechanically coupled to the camera. For example, the first handle may be the handle 400 described above in relation to FIG. 4. At block 704, the user may operate the first handle to wirelessly transmit a first command to a control motor for controlling a lens of the camera. For example, the control motor may be the control motor 500 of FIG. 4. At block 706, the user may control the lens utilizing the first control motor according to the first command. For example, the first command may cause the control motor to rotate to a desired angular position.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A camera control system, comprising:
   at least one handle mechanically coupled to a camera for maneuvering the camera during shooting and configured to wirelessly transmit a command for controlling focus, aperture, or zoom of the camera;
   at least one control motor configured to control the focus, aperture, or zoom of the camera according to the command; and
   a power source for supplying power to the at least one control motor,
   wherein the at least one control motor comprises a first control motor and a second control motor, and wherein the first control motor is configured to receive power directly from the power source, and forward a portion of the received power to the second control motor, and wherein the at least one handle comprises a first handle for wirelessly controlling the first control motor and a second handle for wirelessly controlling the second control motor.

2. The camera control system of claim 1, wherein the handle comprises:
   at least one input device configured to receive a user input;
   a processor configured to generate the command based on the user input; and
   a wireless module configured to transmit the command to the control motor utilizing wireless communication.

3. The camera control system of claim 2, wherein the handle further comprises a battery for supplying power to the processor and the wireless module.

4. The camera control system of claim 1, wherein the control motor comprises:
   a motor configured to control the focus, aperture, or zoom of the camera; and
   a motor driver configured to receive the command wirelessly and generate a control signal to control the motor based on the command.

5. The camera control system of claim 4,
   wherein the control motor further comprises an encoder configured to detect an angular position of the motor, and
   wherein the encoder has a resolution greater than 4000 counts per revolution.

6. The camera control system of claim 1,
   wherein the first handle is configured to wirelessly transmit a first command to the first control motor, and the second handle is configured to wirelessly transmit a second command to the first control motor, and
   wherein the first control motor is configured to forward the second command to the second control motor.

7. The camera control system of claim 1, further comprising:
   a camera rig mechanically coupled to the at least one handle and the at least one control motor, wherein the at least one handle is configured to maneuver the camera via the camera rig.

8. The camera control system of claim 1, further comprising:
   a motor driver configured to receive the command wirelessly and generate a control signal for controlling the control motor based on the command,
   wherein the motor driver and the control motor are physically separated entities.

9. A method of operating a camera, comprising:
   maneuvering the camera during shooting utilizing a first handle and a second handle mechanically coupled to the camera;
   operating the first handle to wirelessly transmit a first command for controlling a lens of the camera;
   operating the second handle to wirelessly transmit a second command for controlling the lens;
   controlling the lens utilizing a first control motor according to the first command; and
   controlling the lens utilizing a second control motor according to the second command.

10. The method of claim 9, wherein the controlling the lens comprises controlling at least one of focus, zoom, or aperture of the lens.

11. The method of claim 9,
    wherein the second handle is configured to wirelessly transmit the second command to the first control motor, and
    wherein the first control motor is configured to forward the received second command to the second control motor.

12. The method of claim 11, further comprising:
    providing power from a power source directly to the first control motor; and
    providing a portion of the power to the second control motor, wherein the first control motor is connected between the power source and the second control motor.

13. The method of claim 9, wherein the operating the first handle comprises operating an input device on the first handle to generate the first command.

* * * * *